Patented Dec. 8, 1925.

1,564,235

UNITED STATES PATENT OFFICE.

ALFRED L. HARRINGTON, OF ROSSLYN FARMS, PENNSYLVANIA, ASSIGNOR TO PITTSBURGH PLATE GLASS COMPANY, A CORPORATION OF PENNSYLVANIA.

PROCESS AND APPARATUS FOR MELTING AND FINING GLASS.

Application filed December 5, 1923. Serial No. 678,598.

*To all whom it may concern:*

Be it known that I, ALFRED L. HARRINGTON, a citizen of the United States, and a resident of Rosslyn Farms, in the county of Allegheny and State of Pennsylvania, have made a new and useful invention in Improvements in Processes and Apparatus for Melting and Fining Glass, of which the following is a specification.

Figure 1:
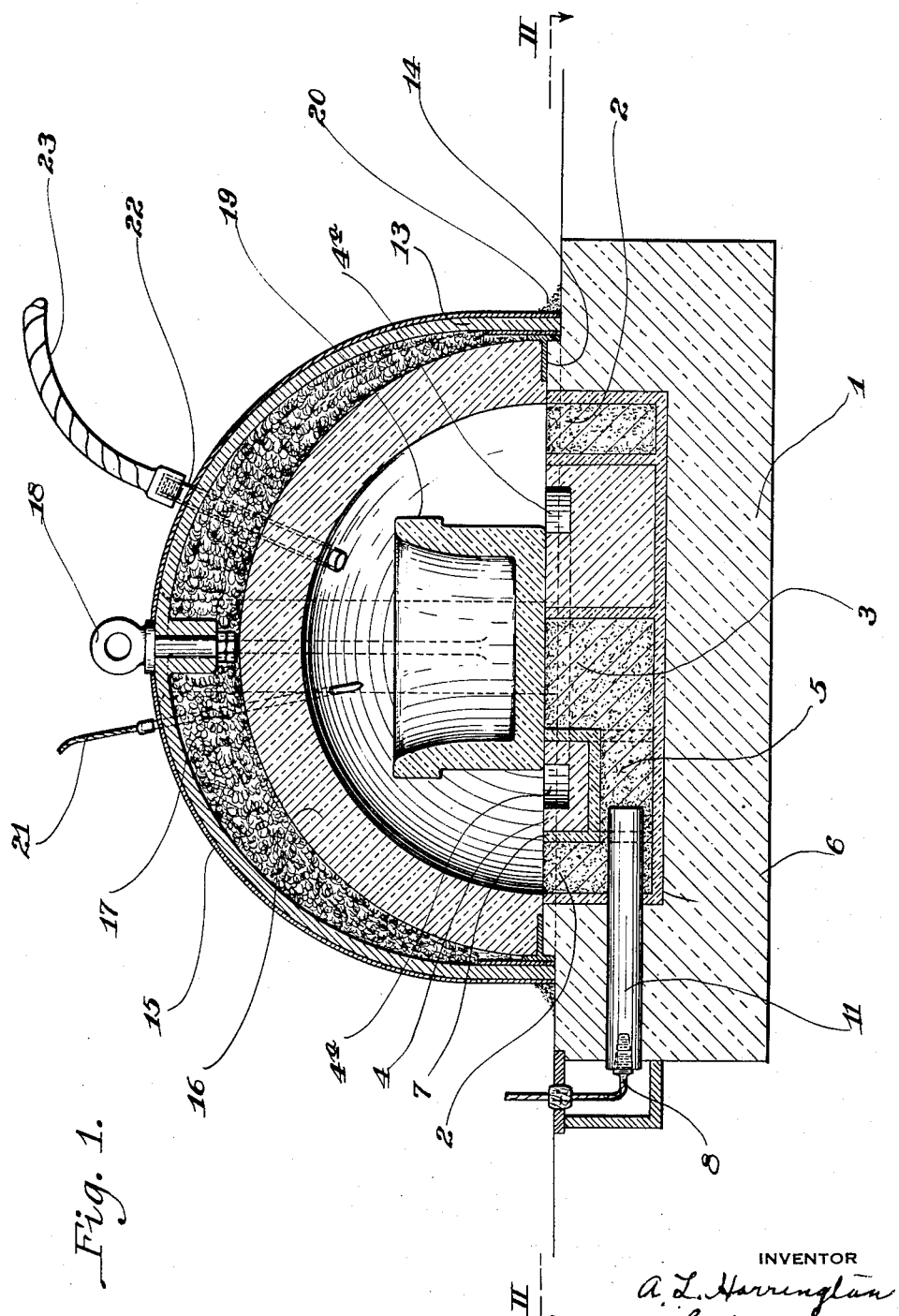
Figure 2:
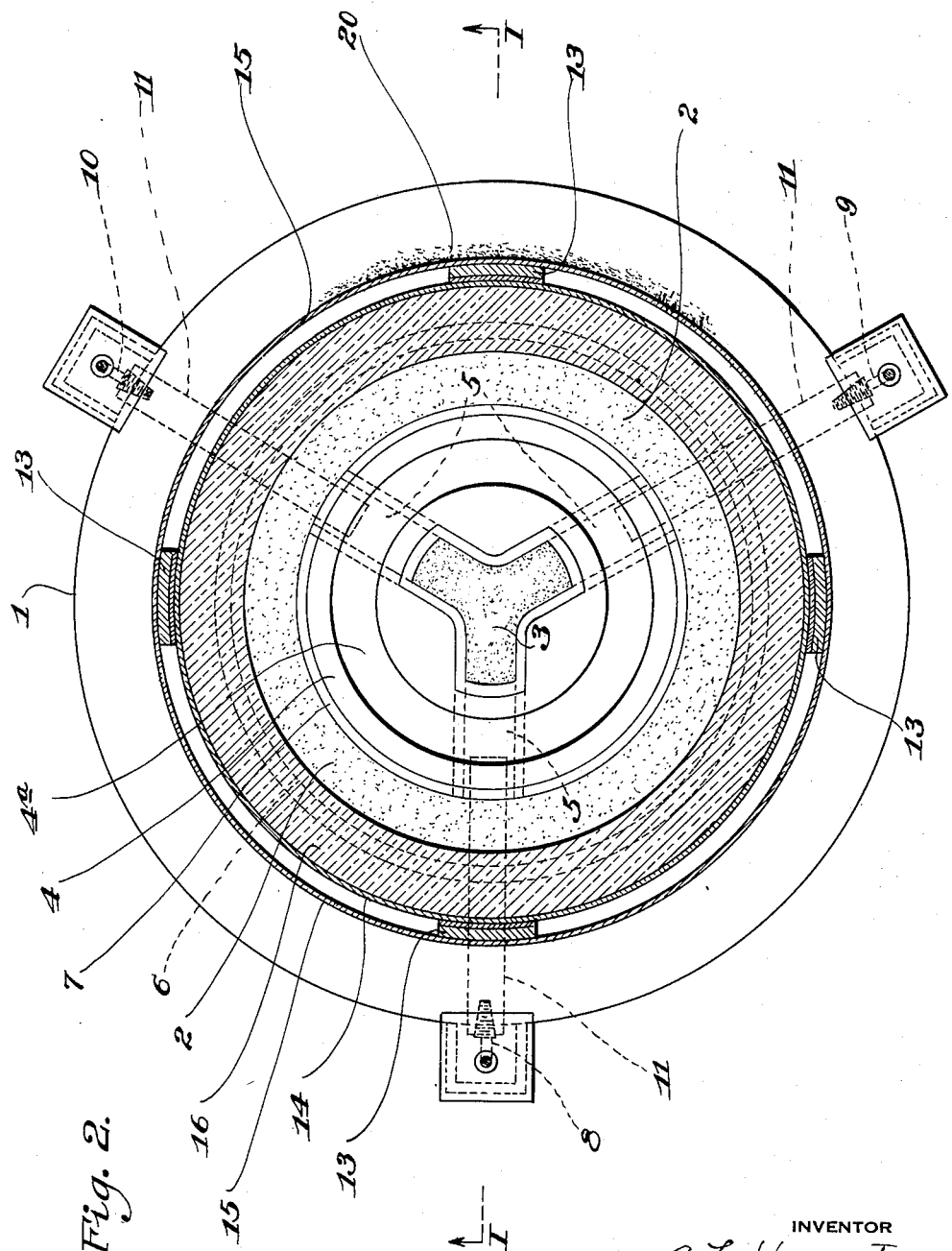

The invention relates to a process and apparatus for melting and fining glass by the use of electricity. It is designed primarily for use in melting glass for use in the manufacture of plates and optical glass, but might be used to advantage for melting glass for use in the manufacture of a variety of other products. It has for its primary objects the provision of a process and apparatus, (1) whereby the heat losses are reduced to a minimum and a very accurate control of temperatures secured; (2) whereby the glass is protected from contamination; (3) and whereby a better fining of the glass and an improved product are secured. One embodiment of the invention is illustrated in the accompanying drawings wherein:

Figure 1 is a vertical section through the construction. And Fig 2 is a transverse section on the line II—II of Fig. 1.

Referring to the drawings, 1 is a refractory base for the furnace, preferably made of clay or fire brick and having in its upper portion recesses for the resistors which are to be employed in heating the furnace. These resistors are preferably made of granulated carbon and preferably consist of the annular portion 2 and the central Y-shaped portion 3 mounted in recesses in the upper portion of the base. Inside the ring 2 is a central portion 4 constituting a part of the base, the ring 2 and member 3 being connected by means of the tunnel portions 5 of the same composition as the parts 2 and 3. The part 4 is preferably provided with a gutter 4ª for catching any glass that boils over from the pot. The portions of the base surrounding the resistors are lined with a material of very refractory composition, preferably carborundum brick as indicated at 6 and 7, such material being more resistant to the intense heat of the resistors than the body portion of the base 1. The resistors are preferably supplied with three phase current to heat them through the leads 8, 9 and 10, which are connected to the carbon terminals 11.

Removably mounted upon the base 1 is a dome shaped cover. This cover has as its framework a spider comprising four legs 13 which are riveted to a T bar base ring 14. Also riveted to the spider 12 is a shell 15 of sheet metal. Mounted upon the T ring 14 is a facing of fire clay or brick 16 and between this facing and the shell 15 is a layer 17 of insulating material, such as silocel. The dome or cover is raised and lowered by means of an overhead crane which engages the eye bolt 18 secured to the center portion of the spider 12.

When the cover is in position over the glass melting pot 19, a tight joint between such cover and the base is secured by means of the sand seal 20. A pyrometer 21 extending through the cover is employed to indicate the temperatures inside the furnace, and a tube 22 extending through the cover and connected to flexible tubing 23 serves as a means for reducing the air pressure under the cover during the fining operation, such tubing being connected to a suitable air exhausting device. This exhaust device may or may not be employed depending upon conditions, the exhausting of the air from the inside of the furnace serving to assist in the fining operation by causing the bubbles in the glass to free themselves therefrom more readily.

The glass may be fused and fined in the furnace, but a greater economy results if the fusing of the glass is accomplished in a separate furnace of the ordinary type, after which the pot is transferred to the electric furnace for the fining operation. The resistor 3 heats the pot and its contents by reason of its contact therewith, while the annular resistor 2 heats the glass and the pot indirectly by bringing the air in the furnace to a high temperature and by reason of the reflected heat from the interior of the dome shaped cover. A very intense heat may be secured in this manner and one which is accurately controlled and which will give the glass a very rapid and thorough fining, particularly if used in connection with the exhaust device, which facilitates the clearing of the glass from bubbles. A large part of the economy in heating is incident to the heat insulation involved in the use of the cover illustrated and described and comprising the layer of silocel and the facing of fire clay or brick. Other advantages incident to the construction and method of operation will be readily apparent to those skilled in the art.

What I claim is:

1. A process of producing glass which consists in preliminarily fusing a glass batch in a pot, transferring the pot with the molten glass to an electric furnace and finishing the operation including the fining in such furnace.

2. A process of producing glass which consists in preliminarily fusing a glass batch in a pot, transferring the pot with the molten glass to an electric furnace and applying a further heat treatment in such furnace.

3. A process of producing glass which consists in enclosing the glass in an electrically heated furnace and reducing the pressure in the furnace to a point below atmospheric pressure during the fining operation.

4. In combination in an electric furnace, a refractory base for supporting a glass pot, an electric resistor mounted in the upper portion of the base, means for supplying a heating current to the resistor, and a removable cup shaped cover provided with heat insulating means mounted on the base and enclosing the glass pot.

5. In combination in an electric furnace, a refractory base for supporting a glass pot, an electric resistor mounted in the upper portion of the base outward of the periphery of the pot, means for supplying a heating current to the resistor, and a removable cover of arch shape provided with heat insulating means mounted on the base and enclosing the glass pot.

6. In combination in an electric furnace, a refractory base for supporting a glass pot, an electric resistor, in the form of a ring of carbanaceous material mounted in the upper portion of the base surrounding the base of the pot, means for supplying a heating current to the resistor, and a cup shaped cover provided with heat insulating means mounted on the base and enclosing the glass pot.

7. In combination in an electric furnace, a refractory base for supporting a glass pot, an electric resistor, comprising a ring portion surrounding the base of the pot and another portion lying beneath the base of the pot, both of such portions being imbedded in said refractory base, means for supplying a heating current to the resistor, and a cover provided with heat insulating means mounted on the base and enclosing the glass pot.

8. In combination in an electric furnace, a refractory base for supporting a glass pot, an electric resistor mounted in the upper portion of the base, means for supplying a heating current to the resistor and a dome shaped cover mounted on the base and enclosing the glass pot and comprising a metal shell with heat insulating means on the inner side thereof faced with a refractory material.

9. In combination in an electric furnace, a refractory base for supporting a glass pot, an electric resistor mounted in the upper portion of the base, means for supplying a heating current to the resistor, and a dome shaped cover mounted on the base and enclosing the glass pot and comprising a metal shell lined with silocel insulation faced with fire clay.

10. In combination in an electric furnace, a refractory base for supporting a glass pot, an electric resistor mounted in the upper portion of the base, means for supplying a heating current to the resistor, and a dome shaped cover mounted on the base and enclosing the glass pot and comprising a metal shell, a metal spider, a heat insulating lining inside the shell, and a refractory facing for the insulating lining.

In testimony whereof, I have hereunto subscribed my name this 21st day of Nov., 1923.

A. L. HARRINGTON.